Feb. 12, 1935.  E. L. WIEGAND  1,990,626

LIQUID HEATING APPARATUS

Filed April 11, 1929

Edwin L. Wiegand
Inventor by Smith and Freeman
Attorneys

Patented Feb. 12, 1935

1,990,626

UNITED STATES PATENT OFFICE 1,990,626

LIQUID HEATING APPARATUS

Edwin L. Wiegand, Pittsburgh, Pa., assignor to Edwin L. Wiegand Company, Pittsburgh, Pa., a corporation of Pennsylvania Application April 11, 1929, Serial No. 354,282

15 Claims. (Cl. 219—44)

This invention relates to electric liquid heaters, such as domestic or technical devices, either portable or stationary and has for its object the provision of a device of high electric and thermal efficiency wherein a very high proportion of the heat generated shall be delivered to the liquid, and wherein the amount of heat retained in the heating element itself shall also be rendered as small as possible; the provision of a liquid heating device wherein the heat is drawn both from the interior and the exterior of the heating element; while further objects and advantages of the invention will become apparent as the description proceeds.

Figure 1:
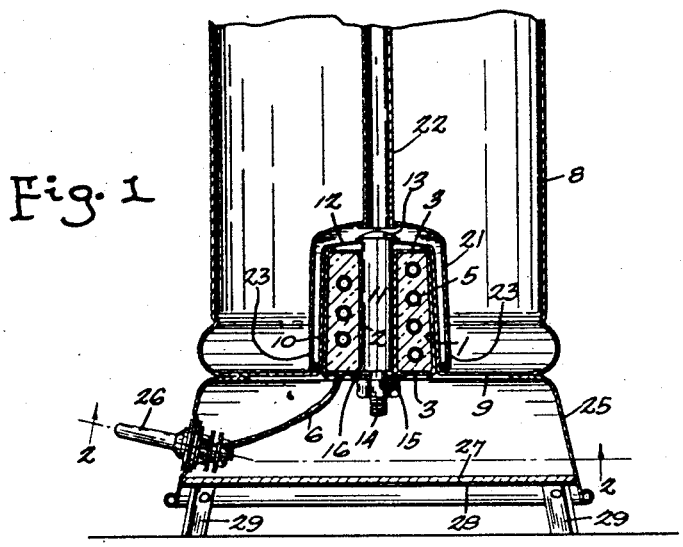
Figure 2:
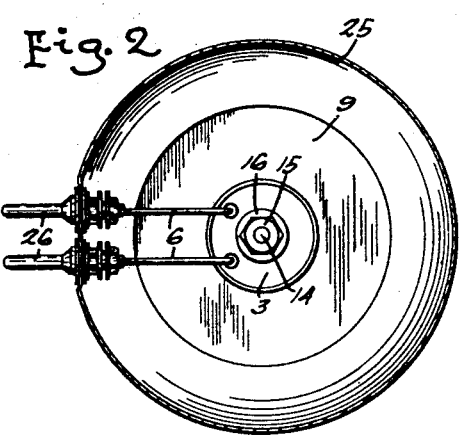
Figure 3:
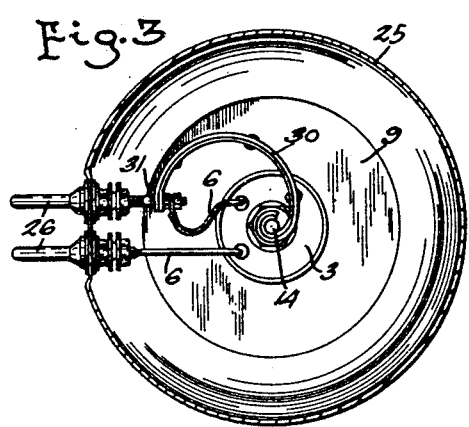
Figure 4:
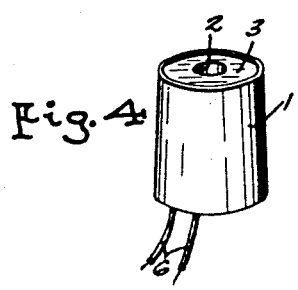

In the drawing accompanying and forming a part of this application I have illustrated my improvements as applied to a domestic percolator, as an illustrative embodiment, although it will be understood that this drawing is intended to be solely illustrative of the principles of my invention and not limiting as to its mode of practical application. Fig. 1 is a vertical sectional view through a percolator containing my improvements; Fig. 2 is a horizontal sectional view corresponding to the line 2—2 of Fig. 1 and looking upwardly; and Fig. 3 is a view similar to Fig. 2 showing a thermostatic control combined with the other features; and Fig. 4 is a perspective view of the heating element removed.

This heating element in the illustrated embodiment comprises an annular, axially-elongated sheet metal casing having an outer wall 1, an inner wall 2 and end walls 3, 3, all coaxial. One part, such as the wall 1, is made separate from the other parts and is applied thereto by spinning or welding or seaming, and the annular space defined within these metal walls is filled with a closely compacted mass of electrically insulating material, having as high a heat conductivity as is practicable to secure in view of the di-electric strength necessary, said insulating material having submerged therein a suitable heat resistance element 5, whose terminals 6, 6 are brought out through one of the end walls 3. The external wall 1 is preferably tapered very slightly, being largest at the end where the terminals 6 emerge; and the present liquid heating apparatus comprises a sheet metal side wall 8, and a sheet metal bottom wall 9, the latter having its center drawn upwardly as shown at 10 to form a recess, tapered like the exterior of the element, and adapted to receive the latter tightly therein. To hold this element in place I have illustrated a metal bolt 11 traversing an aperture in the terminal wall 12 of the recess 10, and having a head 13 overlapping the top of said wall, the opposite end of the bolt having a threaded extension 14 receiving the nut 15 which presses on the washer 16 and thus draws the parts tightly together. Preferably the body of this bolt 11 is made of a size to fit snugly inside the wall 2, in heat-conducting relation, so that the conductivity of this metal bolt may abstract heat from the interior of the element and convey it to the liquid with which the bolt-head 13 is in contact. Preferably this bolt is made of copper because of its high conductivity, although even iron possesses a heat-conductivity superior to that of any known electrically insulating material.

When used as a percolator, I employ a hollow dome 21 and a vertical discharge tube 22 leading upwardly from this dome. The walls of the dome are spaced from the walls of the recess 10 to form a narrow fluid-space around and above the same, while the lower part of the dome communicates with the main liquid space through apertures 23. Obviously, for general liquid heating the tube 22 can be omitted or shortened, or the entire dome and its adjuncts eliminated.

I have shown the bottom of the device as completed by a hollow, sheet metal base 25 suitably fastened to the bottom plate 9 as by soldering or spinning and having one of its walls provided with terminal members 26 to which the terminals 6, 6, are suitably fastened; and to prevent the heat of the element from injuring the supporting surface I have shown a heat obstructing element of asbestos 27 laid on a metal plate 28 as located inside this base and supported by fibre legs 29, 29 which alone rest on the table.

The bolt 11 constitutes a very convenient mounting for a heat-responsive protecting element if desired, in the form of a fuse or thermostat, and such an element is illustrated at 30 in Fig. 3, the same consisting of a bimetallic bar, having one of its ends secured to the extension 14 of the bolt 11 in heat-conducting relation, and its opposite end carrying a movable contact-element 31 electrically insulated from the bar and interposed in circuit between one of the terminal wires 6 and one of the contact members 26, in such wise as to open the circuit upon becoming overheated. It will be seen that whenever the level of liquid in the receptacle falls below the upper end of the recess 10, the bolt 11 will no longer make contact with liquid, and its heat-dissipating rate will become suddenly decreased resulting in a sudden rise in temperature well calculated to actuate a thermostatic element, or to melt a fusible member.

Owing to the close juxtaposition of the heating element and the liquid to be heated, it is possible successfully to generate and absorb beneficially a very large amount of energy in a very small space. Thus when constructed as herein described and claimed it is entirely feasible to impress 350 to 500 watts of energy on a heating element one and one-half inches long and an inch and a half in diameter. Of course these devices can be made of any size desired depending on the energy to be employed, and type of fluid to be heated.

It will be understood that for general heating purposes the peculiar features of the percolator such as the dome 21 and the tube 22, may be omitted together with their function. The heating element may be made of any desired size, although there are advantages in keeping the same small and in employing a plurality of the same when large output is desired. Also such an element may be applied to the fluid-containing vessel otherwise than vertically, and I do not limit myself in any wise to any of the details shown or described except as the same are specifically recited in my several claims which I desire may be construed broadly each independent of limitations contained in other claims.

Having thus described my invention what I claim is:

1. In liquid heating apparatus, in combination, a liquid container, an electric resistance heating element supported with at least a substantial part of its exterior in heat exchanging relation with the liquid contents of said container, a metallic heat-conducting element located inside said heating element and extending outside the same and having a part located in a position to be contacted by the liquid contents of said container, a bi-metallic thermostatic element secured in heat-receiving relation with another part of said conducting element and a contact element carried by said thermostatic element in circuit with the resistance heating element.

2. In liquid heating apparatus, in combination, a liquid container, an electric resistance heating element of annular form supported with at least a substantial part of its exterior in heat exchanging relation with the liquid containing portion of said container, a metallic heat-conducting element traversing the aperture in said element and having heat exchange relations with the wall of said aperture and having a part projecting beyond said element into the liquid containing portion of said container, a bi-metallic thermostatic element secured in heat-receiving relation with another part of said conducting element and a contact element carried by said thermostatic element in circuit with the resistance heating element.

3. In liquid heating apparatus, in combination, a liquid container having a metal wall, an electric resistance heating element located outside of said wall in heat exchanging relation therewith, a metallic, heat conducting member having one end supported in heat-exchanging relation with the liquid contents of said container and also having a part located inside said heating element in position to absorb heat therefrom, and a heat-responsive bi-metallic bar secured to the outer end of said heat-conducting member and adapted to control the flow of electricity through said heating element.

4. In liquid heating apparatus, in combination, a liquid container having a metal wall formed with a hollow boss projecting into the liquid-space, an electric resistance heating element located inside the recess of said boss in heat exchanging relation with the wall thereof, and a metallic heat conducting element secured to the end-wall of said recess and projecting axially of said boss into said heating element in heat-exchanging relation both with the interior of said element and the contents of said container.

5. In liquid heating apparatus, in combination, a liquid container having a metal wall formed with a hollow boss projecting into the liquid space, an electric resistance heating element, of annular form located inside the recess of said boss with its external surface in contact with the wall of said boss, and a metallic securing member fastened to the end wall of said boss and engaging the interior of the aperture in said element in heat conducting relation, said member also having a part engaging a portion of said element in securing relation.

6. In liquid heating apparatus, in combination, a liquid container having a metal wall formed with a hollow boss projecting into the liquid space, an electric resistance heating element of annular form located inside the recess of said boss with its external surface in contact with the wall of said boss, and a metallic securing member fastened to the end wall of said boss and engaging the interior of the aperture in said element in heat conducting relation, and a heat-responsive, circuit-interruption element secured in heat-conducting relation with the outer end of said member.

7. In liquid heating apparatus, in combination, a liquid container having a metal wall formed with a hollow boss projecting into the liquid-space, an electric resistance heating element located inside the recess of said boss, said element being annular in form, and a metallic, heat conducting element having one end secured to the end wall of said boss and its body making heat-conductive contact with the wall of the aperture in said element.

8. In liquid heating apparatus, in combination, a liquid container, an electric resistance heating element of annular form the thickness of the annulus in an axial direction being at least one-half as great as its thickness in a radial direction, means supporting said element endwise to the liquid container, and a heat-conductible metallic member additional to the element engaging the interior surface of the bore therein and also engaging the wall of said container.

9. In liquid heating apparatus, in combination, a liquid container, an electric resistance heating element of annular form, said element being completely enclosed in a sheet metal sheath, the axial length of said sheath being at least one-half as great as the radial distance between its inner and outer walls, means for supporting said element endwise to the liquid container, and a heat-conductive metallic member additional to the element engaging the interior surface of the bore therein and also engaging the wall of said container.

10. In liquid heating apparatus, in combination, a liquid container having a metal wall formed with a hollow boss projecting into the liquid-space, an electric resistance heating element located inside the recess of said boss, said element being completely enclosed in a sheet metal sheath, the axial length of said sheath being at least as great as the radial distance between its inner and outer walls, the outer wall of said sheath engaging the wall of said boss, and a heat conducting metallic member traversing the bore of said element and fastened to the end wall of said boss.

11. In liquid heating apparatus, in combination, a liquid container, a sheet-metal-sheathed, electric-resistance-heating-element of annular shape, a metal conducting member passing through the bore of said element and fastening said element with a part of its exterior surface in contact with the wall of the liquid container, and a heat-responsive, circuit breaking-element carried by the outer end of said conducting member.

12. In a liquid heating apparatus, in combination, a liquid container, an electric resistance heating element of annular shape, and a solid metallic element of heat-conducting metal traversing a wall of said container into heat exchange relation with the liquid and also projecting into the cavity of said element in heat-receiving relation therewith, whereby the heat produced by said element is conducted into the interior of said liquid container.

13. In a liquid heating apparatus, the combination of a liquid container having a metal wall, an electrical resistance heating element annular in shape and having an axially tapered outer surface, means supporting said heating element with its vertical axis perpendicular to said wall and a substantial part of its tapered surface in heat conducting relation with said wall, a metal heat conducting member extending through said heating element and serving to secure the same in place and a circuit breaker connected with the outer end of said heat conducting member.

14. In a liquid heating apparatus, the combination of a liquid containing vessel one wall of which is formed of metal and provided with an inwardly directed hollow boss projecting into the liquid space, an electrical resistance heating element positioned within the recess of said boss, the interior of said boss and the exterior of the heating element being complementarily tapered and means holding the tapered surface of said heating element in wedging contact with the tapered wall of said boss.

15. In a liquid heating apparatus, the combination of a liquid containing vessel, one wall of which is formed of metal and provided with an inwardly directed hollow boss projecting into the liquid space, an electrical resistance heating element positioned within the recess of said boss, the interior of said boss and the exterior of said heating element being complementarily tapered, and a heat conducting member extending through said heating element and securing the tapered surface of the heating element in wedging contact with the tapered wall of said boss.

EDWIN L. WIEGAND.